United States Patent
Alm et al.

(10) Patent No.: US 8,953,480 B2
(45) Date of Patent: Feb. 10, 2015

(54) METHOD AND ARRANGEMENT IN A WIRELESS COMMUNICATION SYSTEM

(75) Inventors: Martin Alm, Mölnlycke (SE); Fredrik Athley, Kullavik (SE); Erik Eriksson, Linköping (SE); Magnus Lundevall, Sollentuna (SE); Arne Simonsson, Gammelstad (SE)

(73) Assignee: Telefonaktiebolgaet L M Ericsson (publ), Stockholm (SE)

( * ) Notice: Subject to any disclaimer, the term of this patent is extended or adjusted under 35 U.S.C. 154(b) by 2 days.

(21) Appl. No.: 13/576,191

(22) PCT Filed: Feb. 5, 2010

(86) PCT No.: PCT/SE2010/050137
§ 371 (c)(1),
(2), (4) Date: Jul. 31, 2012

(87) PCT Pub. No.: WO2011/096862
PCT Pub. Date: Aug. 11, 2011

(65) Prior Publication Data
US 2012/0287813 A1    Nov. 15, 2012

(51) Int. Cl.
H04L 27/00     (2006.01)
H04B 7/216    (2006.01)
H04W 4/00    (2009.01)

(52) U.S. Cl.
USPC ........... 370/252; 370/329; 370/337; 275/259; 455/452

(58) Field of Classification Search
USPC .......... 370/252–341, 465–477; 375/227–261; 455/450–561
See application file for complete search history.

(56) References Cited

U.S. PATENT DOCUMENTS

| | | | | |
|---|---|---|---|---|
| 6,134,230 | A * | 10/2000 | Olofsson et al. | 370/337 |
| 6,542,742 | B2 * | 4/2003 | Schramm et al. | 455/436 |
| 6,804,253 | B2 * | 10/2004 | Western | 370/465 |
| 6,823,005 | B1 * | 11/2004 | Chuang et al. | 375/227 |
| 6,865,233 | B1 * | 3/2005 | Eriksson et al. | 375/261 |

(Continued)

FOREIGN PATENT DOCUMENTS

| | | |
|---|---|---|
| CN | 101180823 A | 5/2008 |
| WO | 2006018892 A1 | 11/2006 |

(Continued)

OTHER PUBLICATIONS

Assaad, Mohamad, "Reduction of the Feedback Delay Impact on the Performance of Scheduling in OFDMA Systems," 70th IEEE Vehicular Technology Conference, Sep. 20-23, 2009, Anchorage, Alaska.

*Primary Examiner* — Man Phan
(74) *Attorney, Agent, or Firm* — Murphy Bilak & Homiller, PLLC (57) ABSTRACT

Method and arrangement in a network entity for supporting link adaptation in a wireless communication system. The method comprises obtaining 204 one or more predicted parameters related to the quality of a radio link. The method further comprises measuring 206 one or more actual parameters, corresponding to the one or more predicted parameters. The method further comprises deriving 208 one or more error distributions based on the difference between the predicted and actual one or more parameters, from which error distributions a link adaptation margin estimate is derived, based on a predetermined radio link quality target. The link adaptation margin estimate is then used for supporting link adaptation for the radio link.

18 Claims, 5 Drawing Sheets

(56) References Cited

U.S. PATENT DOCUMENTS

| | | | |
|---|---|---|---|
| 7,016,670 B2 * | 3/2006 | Agin | 455/423 |
| 7,027,420 B2 * | 4/2006 | Hamalainen | 370/335 |
| 7,310,499 B2 * | 12/2007 | Magnusson et al. | 455/69 |
| 7,444,169 B2 * | 10/2008 | Ishii et al. | 455/561 |
| 7,577,227 B2 * | 8/2009 | Budka et al. | 375/377 |
| 8,270,500 B2 * | 9/2012 | Tidestav | 375/259 |
| 8,295,370 B2 * | 10/2012 | Thurfjell et al. | 375/259 |
| 8,681,721 B2 * | 3/2014 | Furuskar et al. | 370/329 |
| 2003/0198312 A1 | 10/2003 | Budka et al. | |
| 2005/0170782 A1 * | 8/2005 | Rong et al. | 455/67.11 |
| 2005/0181811 A1 | 8/2005 | Magnusson et al. | |
| 2008/0004032 A1 * | 1/2008 | Lironi et al. | 455/452.2 |

FOREIGN PATENT DOCUMENTS

| WO | 2006118896 A2 | 11/2006 |
|---|---|---|
| WO | 2009075617 A1 | 6/2009 |

* cited by examiner

METHOD AND ARRANGEMENT IN A WIRELESS COMMUNICATION SYSTEM

TECHNICAL FIELD

The invention relates to a method and an arrangement in a wireless communication system, in particular to the support of link adaptation.

BACKGROUND

A commonly used practice to reach spectral efficiency in radio communication systems of today is the use of adaptive modulation and coding (AMC). When applying AMC in a radio communication system, the modulation and coding of data to be transmitted are selected to match the current channel quality, in order to achieve high system throughput and low delay. For example, AMC is used in VIE both in the uplink (UI) and the downlink (DL).

In LIE, an instantaneous downlink channel quality is estimated by a mobile terminal, based on measurements performed on reference signals transmitted from a base station. From the measurements, a channel quality report, e.g. a Channel Quality Indicator (CQI), is derived and transmitted in the uplink to the base station. Then, a modulation order and a code rate to be used when addressing said mobile terminal, can be selected in the base station, at least partially based on the reported quality.

Figure 1:
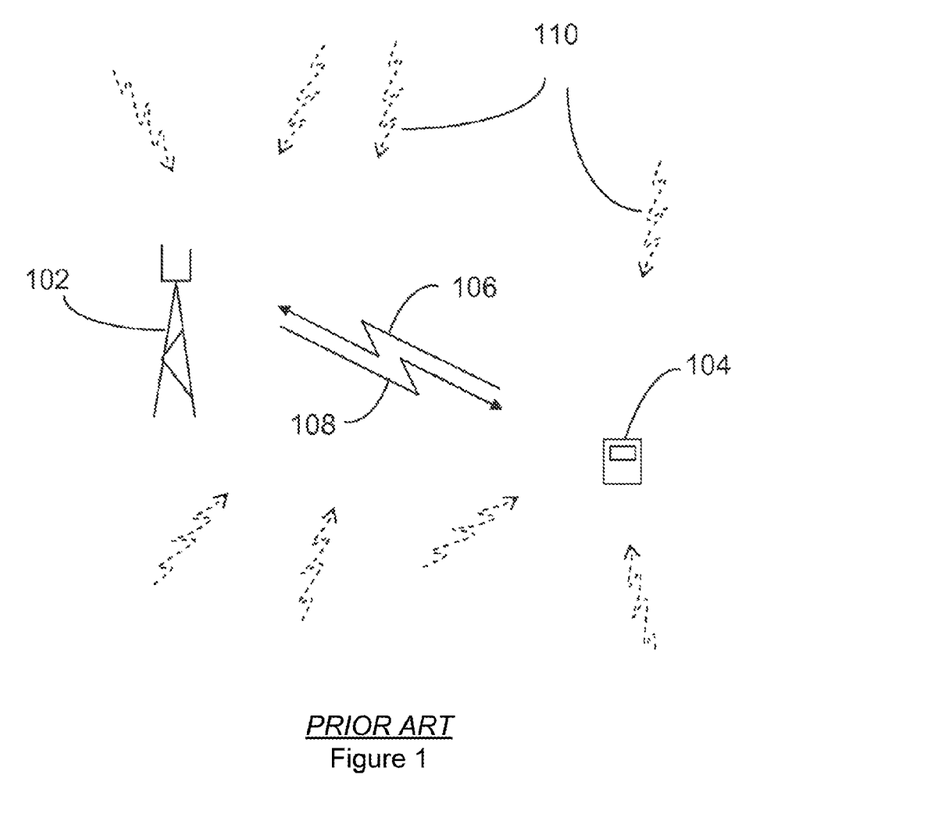
FIG. 1 is a schematic view illustrating a network node and a mobile terminal, in which embodiments of the invention could be applied.

A typical scenario comprising a network node 102 and a mobile terminal 104 is illustrated in FIG. 1. The network node 102 transmits signals 108 to the mobile terminal 104 in the downlink, and the mobile terminal 104 transmits signals 106 to the network node 102 in the uplink. Unwanted signal energy and/or thermal noise, i.e. interference, is illustrated as dashed arrows 110. In the uplink, a channel quality estimate can be obtained from measurements on received mobile terminal transmissions 106. The mobile terminal transmissions 106 may comprise regular data or so called sounding reference symbols. A sounding symbol is a special reference symbol, which is known to the receiver, and is used for channel estimation. The interference 110 experienced in a network node 102, e.g. a base station, can be estimated by measuring, in the network node 102, the total received power, and then subtracting the power of the desired signal 106. The thus obtained interference estimate applies to all mobile terminals in the cell, even mobile terminals which are not currently transmitting. The modulation and coding scheme (MCS) to be used in the uplink is then indicated to the respective mobile terminals in a "grant" message. The grant is transmitted from the base station 102 to the mobile terminal 104 and indicates assigned resources and selected MCS.

Since the MCS must be selected prior to the transmission, it is always based on an estimate or prediction of the actual channel quality during the transmission. More or less advanced schemes can be used in the process of channel quality estimation, but a common strategy is to filter historic channel quality values, and subtract a safety margin, or "back-off", to compensate for the inherent uncertainty of the estimate.

The MCS should generally be selected to give high spectral efficiency and low packet delay. Often, a block error rate (BIER) target is given as a guideline of a good trade-off between throughput and delay. Different algorithms based on BIER target are commonly used in communication systems such as High Speed Packet Access (HSPA), where the back-off is typically based on the experienced block error performance. Algorithms based on BIER are typically applied as an outer-loop, adjusting a back-off margin, set by a relatively fast inner-loop, based on e.g. CQI. An example of such an outer-loop algorithm, which is commonly used, is the so called "jump algorithm", which is further described e.g. in the patent document U.S. Pat. No. 7,310,499.

One of the major drawbacks of previously used outer-loop solutions is that they converge slowly and require a large number of transmissions in order to obtain sufficiently good statistics. This is especially true for low BIER target. In OFDM-like systems, where mobile terminals can be assigned park of different size of the frequency-band, the channel quality prediction can be very poor for small park or allocations comprising few e.g. resource blocks, but quite good for large park or allocations comprising a comparatively large number of resource blocks. To handle this difference with one of said previously known outer-loop algorithms would slow it down even further.

Consequently, it is a problem that the above described estimation and adjustment of a link adaptation (LA) margin is slow, which has a negative effect on the efficiency in radio link resource utilization, especially at low to medium traffic loads.

SUMMARY

It would be desirable to obtain a faster process for adjusting a link adaptation to the actual/true quality of a channel or radio link. It is an object of the invention to address at least some of the issues outlined above. Further, it is an object of the invention to provide a method and an arrangement for estimating a link adaptation margin.

According to one aspect, a method is provided for supporting link adaptation in a wireless communication system. Within the method, one or more predicted parameters related to the quality of a radio link are obtained. Further, one or more actual parameters, corresponding to the one or more predicted parameters, are obtained. Then, one or more error distributions are derived, which are based on the difference between the predicted and actual one or more parameters. Then, a link adaptation margin estimate is derived from the one or more error distributions, based on a predetermined radio link quality target, which link adaptation margin estimate is used for supporting link adaptation for the radio link.

According to another aspect, an arrangement is provided, which is adapted to support link adaptation in a wireless communication system. The arrangement comprises a functional unit for obtaining predictions of one or more parameters related to the quality of a radio link, and a functional unit for measuring the one or more parameter. The arrangement further comprises functional units for deriving one or more error distributions based on the difference between the predicted and actual one or more parameters, and for deriving a link adaptation margin estimate from the one or more error distributions, based on a predetermined radio link quality target, which link adaptation margin estimate is used for supporting link adaptation for the radio link.

The above method and arrangement may be used to rapidly obtain a link adaptation margin estimate, and may be applied, located or integrated in a network node, such as a base station, or in a mobile terminal. Further, the method and arrangement enables a joint measurement of interference in the uplink for all user terminals, which gives a more accurate result as compared to when measurements are made per user terminal. Further, the method and arrangement enables that the received signal strength/gain in the uplink can be measured for sounding signals and scheduled CSI transmissions, which is not the case in currently used solutions. This possibility enables a faster updating of a link adaptation margin estimate, than when using previously known solutions.

The above method and arrangement may be implemented in different embodiments. In some embodiments, the predetermined quality target is related to a BIER target.

In some embodiments, the predicted and measured one or more parameters comprise Signal-to-Interference-and-Noise Ratio (SINR), and in some other embodiments, the predicted and measured one or more parameters comprise received signal strength/gain and interference. The dividing of estimation and measurement of the SINR into separate estimations and measurements of received signal strength/gain and interference may be beneficial, since received signal strength/gain, typically, is different for each link, whereas the interference may be similar for multiple links. Further, it may be beneficial to differentiate the updating frequency of the estimates related to the different components received signal strength/gain and interference.

In some embodiments, an error distribution of at least one correction factor e is derived. The correction factor e could be related to e.g. characteristics of one or more network entities, such as interference suppression or cancellation. It could further be related to MIMO (Multiple-Input Multiple-Output), such as effects of MU-MIMO (Multi User-MIMO) and/or different MIMO transmission formats; a receiver method, or an error in modeling receiver performance. The correction factor e enables the method and arrangement to take e.g. the above mentioned items into account when estimating a link adaptation margin, thereby obtaining a more accurate estimate.

In some embodiments, different error distributions are derived for each receiver method being used, and/or for each MIMO transmission format being used.

In some embodiments, values from at least two error distributions are combined when deriving the link adaptation margin estimate. For example, a signal strength/gain prediction error and a corresponding interference prediction error could be added to form a link adaptation margin estimate, or, two error distributions could be combined to one error distribution before deriving an estimated link adaptation margin.

In some embodiments, measurements are performed in a frequency selective manner, i.e. for parts or subsets of the frequency band, which enables deriving different link adaptation margin estimates for different fractions of the frequency band.

BRIEF DESCRIPTION OF DRAWINGS

The invention will now be described in more detail by means of exemplary embodiments and with reference to the accompanying drawings, in which.

DETAILED DESCRIPTION

Briefly described, a method and arrangement are provided for estimation of a link adaptation margin by use of one or more error distributions, e.g. a Signal-to-Interference-and-Noise Ratio (SINR) estimation error distribution. An adequate link adaptation margin may be derived, in alternative ways, for the one or more error distributions, based on a desired quality target. The one or more error distributions, and thereby the estimated link adaptation margin, can be made frequency selective. The link adaptation margin can be derived e.g. from a estimation error distribution of the SINR, or alternatively, for the estimation error distributions of the received signal strength and the interference Some definitions:

Within this document some expressions will be used when discussing the procedure of estimating a link adaptation margin, of which some will be briefly defined here.

The expressions "back-off" and "back-off margin" are used as referring to a safety margin, such as a link adaptation margin.

The terms "gain" and "signal strength", when referring to estimated or measured parameters, are used interchangeably, even though the channel gain is a normalization, in terms of transmission power, of a received signal strength. The parameter, which is measured in a receiver is the received signal strength, but the parameter, which clearly indicates the effect of a radio link on a received signal is the gain. Therefore, the expression "signal strength/gain" is used throughout this document.

The term "network entity" is used as referring to both network nodes and mobile terminals. The term "network node" is used as referring to radio transmitting network entities having a base station-like function and applying link adaptation. Such network nodes could also be referred to as e.g. eNB, base station, relay node, RBS, NodeB, etc, depending on function and on which radio access technology (RAT) that is discussed. The terms "mobile terminal" and "user terminal" are used as referring to any radio transmitting wireless mobile devices, such as e.g. user equipment (UE), personal digital assistant (FDA), laptops, or the like, for which link adaptation is applied.

The "radio link", of which the quality is discussed herein, is only considered in one direction, i.e. the direction towards the network entity in which an embodiment of the invention is applied.

Generally, when deciding which channel coding and modulation to apply in a network entity, a SINR is estimated. Then, the SINR estimate is adjusted by an estimated link adaptation margin, which is updated by an outer-loop based on ACK/NACK statistics from a receiver. Then, a modulation and coding scheme (MCS) is selected based on the adjusted SINR estimate. In other words, a parameter related to the quality of a radio link is estimated, and an MCS is selected based on the estimated parameter adjusted by an LA margin.

Within embodiment of the invention, it is instead the probability distribution of the error in the estimates of one or more parameters related to the quality of a radio link, which is used as base for deriving e.g. an LA margin and an MCS. Given a probability distribution, e.g., of a SINR estimation error distribution, an LA margin is selected to achieve a predetermined radio link quality target, e.g. a Block Error Rate (BIER) target, from a percentile of the SINR estimation error distribution corresponding to the predetermined radio link quality target. This will be described in more detail later below.

Further, the effective SINR estimate can be seen as a function of the signal strength, or gain, S and the interference $$SINR=f(S,I). \quad (1)$$

Figure 4:
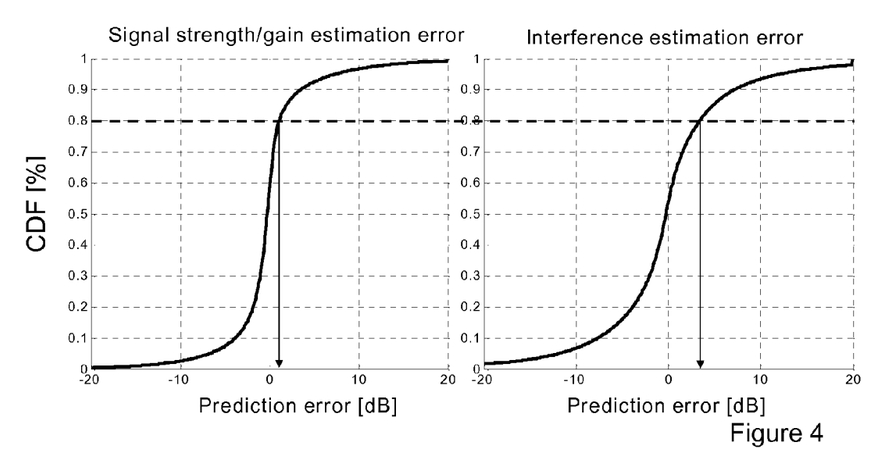
FIG. 4 shows the probability distributions of the signal strength/gain- and the interference estimation error, according to one embodiment.

Thus, as an alternative to deriving the LA margin and MCS from the error distribution of a SINR-estimate, these parameters could be derived from the separate error distributions of an S-estimate and an I-estimate. This may be done either directly, e.g. from the error distributions of S-estimates and I estimates, respectively, as illustrated in FIG. 4, or from an error distribution of SINR-estimates, which error distribution is formed by combining the error distributions of the S- and I-estimates. The dividing of estimation and measurement of the SINR into separate estimations and measurements of S and I may be beneficial, since S, typically, is different for each link, whereas I may be similar for multiple links Further, a SINR estimation error depends on the estimation errors in the respective component signal strength/gain and interference. These component may fluctuate in different ways. Therefore, it may be beneficial to differentiate the updating frequency of the estimates related to the different component, e.g. such that the estimates related to a component, which changes relatively fast may be updated more frequently than estimates related to a component, which changes comparatively slow.

Below, different embodiments of an LA margin estimation procedure will be described. The procedure of estimating a link adaptation margin can be applied for transmissions both in the uplink (UI) and the downlink (DL), i.e. in both network nodes and mobile terminals. The example embodiments below are written with the 3rd Generation Partnership Project (3GPP) LTE standard as baseline, but are applicable, possibly with some modifications to match respective system implementations, to any system using AMC, such as e.g. Mobile WiMAX and WCDMA.

A step wise description of an embodiment for UL transmissions, i.e. an embodiment in a network node, where the gain and interference are measured and estimated separately, could be made as follows:

Derive the interference estimation error distribution per cell. This could be done frequency selective, e.g. per resource block (RB) in LTE.

Derive the signal strength, or gain, estimation error distribution per mobile terminal, based on measurements on uplink transmissions from mobile terminals. This could also be done frequency selective, or not depending on which system that is used.

Schedule a mobile terminal for uplink transmission in a number of resource blocks.

Extract the error percentile corresponding to a predetermined radio link quality target, e.g. a desired maximal HARQ (Hybrid Automatic Repeat Request) BIER, from the signal strength/gain- and interference estimation error distributions for the scheduled resource blocks.

Combine the extracted percentiles, to form an estimated SINR error percentile.

Use the estimated SINR error percentile as link adaptation margin, e.g. when selecting MCS for uplink transmissions in the resource blocks in question.

Alternatively, the SINR estimation error distribution could be derived, either by estimating the SINR rather than the signal strength/gain and interference separately, or, by combining the interference- and signal strength/gain estimation error distributions to a SINR estimation error distribution before extracting the error percentile corresponding to the predetermined radio link quality target.

In general terms, an estimation error distribution can be estimated according to the following formula:

$$S_{\sigma(X)} = S_{\sigma(X)} \cup g(Q_X(t) - \hat{Q}_X(t|t-d)) \quad (2)$$

$$CDF(S_{\tau(X)}) \quad (3)$$

where $S_{\sigma(X)}$, or $S_i$ for a distribution i, is a set of samples of a real valued variable, e.g an estimation error distribution, and CDF ($S_{\sigma(X)}$) is the empirical cumulative distribution function of the set of samples $S_{\sigma(X)}$. The parameter Q is a measured quality at time t, where quality may be e.g. interference or signal strength/gain; $\hat{Q}$ is the estimated or predicted quality estimated at time t-d, where d is the delay between the selection of an MCS for a certain transmission and the reception of the transmission. For example, in LIE, d is approximately 6 ms; X is the resource for which the estimation is done. In LTE, X may typically be a resource block (RB) pair, a set of RB pairs, or RB pairs over the entire bandwidth.

The function σ is typically a mapping σ(X)=X or σ(X)=1 for all X. In the first case, where σ(X)=X, an estimation error distribution is derived for each resource X, while in the second case, where σ(X)=1, only one estimation error distribution is derived, which covers all resource allocations X. When X is a frequency resource, such as an LTE RB pair, the mapping σ(X)=X enables frequency selectivity, while the mapping σ(X)=1 implies one estimation error distribution for the entire frequency band, i.e. all LTE RBs concerned. When Q is related to signal strength/gain, σ(X)=1 may be a preferred alternative, while if Q is related to interference, and frequency selective interference is expected, due to for example inter-cell interference coordination (ICIC) or scheduler behavior, σ(X)=X can be a preferred alternative for the interference.

The parameter g in equation (2) is a mapping to the set $S_{\sigma(X)}$. For example, if S is implemented as a bucket based histogram, g is typically a mapping to the closest bucket, i.e. quantization.

Further, the statistics of the interference experienced in a network node is common for all mobile terminals served by the network node. Thus, the uplink interference can be jointly and continuously measured, e.g. at predetermined intervals, which enables an accurate and up to date error distribution per resource block, which captures interference variations. The measurements of received signal strength in a network node, on the other hand, are made separately for each mobile terminal, and can only be performed when the respective mobile terminals transmit.

For a mobile terminal scheduled over RB={k . . . k} an appropriate IA margin estimate can be derived by first estimating an estimation error distribution for the mobile terminal, using a receiver model. For example, a receiver model "f" can be formulated as follows:

$$f(S, I) = \frac{\sum_{Antennas} S}{I} \quad (3)$$

where the signal strength received by different receiver antennas are combined.

An appropriate SINR LA margin can then be estimated or derived by mapping into the CDF of the error distribution of the SINR at a certain point, $Perc_{Target}$, where $Perc_{Target}$ is a constant or a function dependent on a predetermined radio link quality target, e.g. a selected BlER target. By "mapping" is meant reading or computing an x-value corresponding to a certain y-value in a distribution. An example of deriving an LA margin estimate from CDR will be described further below, with reference to FIG. 4.

The above described function SINR=f(S,I), equation (1), is suitable for receivers having no ability to suppress or cancel interference. For receivers having such an ability to suppress or cancel interference, e.g. receivers applying so called MMSE (Minimum Mean Square Error) reception, SIC (Successive Interference Cancelation) or IRC (Interference Rejection Combining), there will also be estimation errors depending on receiver characteristics. For example, even if a SINR is estimated with approximately 100% accuracy, the estimated LA margin would still not be appropriate for e.g. an MMSE receiver, since such a receiver may suppress the interference, and thereby experience an interference, after suppression, which is lower than the actual measured, and possibly accurately estimated, interference. The interference estimation error depending on receiver characteristics is then the difference between the received interference and the experienced interference after interference suppression. Receivers could also improve the experienced received signal strength/gain, e.g. by using antenna arrays, or the like, which also will result in SINR estimation errors. Another example of receiver characteristics, which may induce e.g. SINR estimation errors, is the use of an adaptive amount of receiver antennas.

Errors depending on receiver characteristics could, at least partly, be compensated for by the introduction of a receiver efficiency error distribution term. Instead of assuming perfect compliance between model and real receiver performance, an error term e is added to the original equation (1), and f is replaced with an estimate of f, $\hat{f}$.

$$SINR = \hat{f}(S,I) + e \quad (4)$$

The model errors could then be calculated as the difference between received processed SINR, including interference rejection/suppression and antenna array gains, and the estimated SINR based on the measured "unprocessed" interference and signal strength/gain. An estimate of a safety margin to be applied to the estimated SINR is then based on the combination of the signal strength/gain estimation error distribution, the interference estimation error distribution and the modeling error distribution.

In the uplink, the modeling error distribution can be estimated per mobile terminal or per cell. It may be preferred to make the estimation per cell, since the modeling error mainly depends on the interference characteristics and the cell antenna setup, which is common for all mobile terminals in a cell. Using one uplink modeling error distribution per cell enables measurement updates whenever any mobile terminal is scheduled within the cell.

Similarly to the compensation for receiver characteristics described above, the effect of performance improving transmitter characteristics, such as pre-coding/beamforming, could be taken into account and be compensated for in the estimation of an LA margin. The effect, e.g. of MU-MIMO (Multi User-Multiple Input Multiple Output) could also be taken into account, for example by altering the interference measurement depending on if simultaneous transmission is scheduled or not or by adding a MU-MIMO error distribution to the model.

Thus, one error term $e_m$ could be added for each error generating feature m, that is necessary and/or desired to take into account in a certain embodiment, as follows:

$$SINR = \hat{f}(S,I) + \sum_{m=0}^{n} e_m \quad (5)$$

where m=(0, 1, ..., n)

Figure 2:
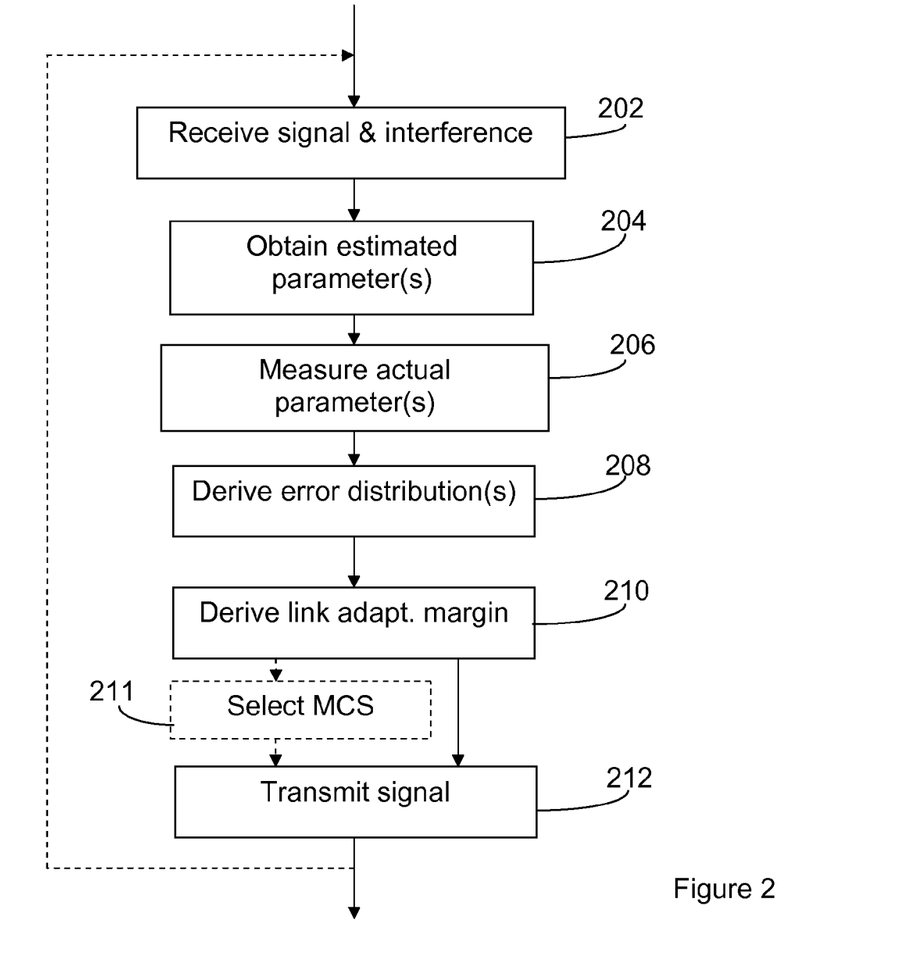
FIG. 2 is a flow chart illustrating method steps according to an embodiment.

An embodiment of the procedure of supporting link adaptation will now be described with reference to the flowchart in FIG. 2 with steps performed by a network entity. Initially, a signal transmitted from another network entity and interference are received in a step 202. The signal could comprise, e.g. user data or reference signals. Alternatively, the signal could comprise estimates related to the quality of a radio link. Then, one or more estimates of parameters related to the quality of the radio link, such as e.g. SINR, or separately, received signal strength S and interference I, are obtained in a step 204. For received signals comprising estimates of one or more parameters related to the quality of the radio link, which are made in another network entity, the obtaining in step 204 only involves e.g. extracting the desired parameter estimates from the received signal, and storing them, e.g. in a memory, for later use. Otherwise, i.e. for other signal contents and interference, the obtaining in step 204 involves estimation, i.e. prediction, of quality related parameters of the radio link, over which the received signal was transmitted. In order to estimate said parameters, the obtaining step should have access to measurements performed on the radio link.

At the reception of a transmission over the radio link, measurements are performed in a step 206 on the one or more parameters related to the quality of the radio link, e.g. the SINR, or separately, the signal strength of a signal received over the radio link, and the interference experienced at the network entity. The interference parameter is present also when no transmissions from other network entities arrive, and could therefore be measured continuously, e.g. at certain predetermined intervals. The signal strength/gain parameter, on the other hand, could only be measured when receiving a transmission from another network entity.

Then, the one or more measured, actual, parameters are compared to the corresponding one or more estimated parameters, and from the difference between the actual and the estimated one or more parameters, one or more parameter estimation error distributions are derived in a step 208. From the one or more derived error distributions, an estimated link adaptation margin is derived in a step 210. One way to derive the estimated link adaptation margin is to derive it from the CDR of the estimation error distributions at a certain quality target percentile, which will be further described later below with reference to FIG. 4. The derived link adaptation margin estimate is then provided, either e.g. to a functional unit within the network entity, or to another network entity, for use as link adaptation margin when selecting which MCS that should be used when transmitting over the radio link.

Depending on if the selection of MCS is performed in a step 211 within the network entity or in another network entity, a signal transmitted to another network entity in step 212 comprises either the link adaptation margin estimate or an indication of which MCS to use when transmitting over the radio link. For example, when the selection of MCS is not performed within the network entity, the link adaptation margin estimate is transmitted in step 212 to another network entity, which is to transmit over the radio link concerned. When the selection of MCS is performed in a step 211 within the network entity, a selected MCS is transmitted in step 212 to another network entity, which is to transmit over the radio link concerned.

There may be variations in how the above procedure is to be implemented in different systems, such as e.g. VIE, WiMAX, WCDMA, due e.g. to differences in how and where the measuring and reporting of channel parameters are implemented today, and how and where the link adaptation margin is currently selected.

Below, an example arrangement 300, adapted to enable the performance of the above described procedure in a network entity 301, will be described with reference to FIG. 3. The network entity 301 comprises a receiving unit 302, which is adapted to receive signals transmitted from other network entities over a radio link. The received signals could comprise e.g. user data or pilot symbols, such as sounding or demodulation reference symbols. Alternatively, the signals could comprise estimates related to the quality of a radio link. The arrangement 300 comprises a prediction unit 310, which is adapted to obtain one or more estimated parameters related to the quality of the radio link, and a measuring unit 304, which is adapted to measure one or more actual parameters corresponding to the one or more estimated parameters. The measuring unit 304 may also be adapted to provide the result of measurement of parameters related to the quality of the radio link to the prediction unit 310, which then could estimate future radio link quality parameters based on the provided result.

The arrangement 300 further comprises a distribution unit 306, which is adapted to derive one or more error distributions based on the differences between the one or more estimated radio link parameters and the one or more measured actual radio link parameters. An exemplary quality related parameter, which could be estimated and measured, is the SINR, or, alternatively, the interference and the signal strength/gain. The arrangement 300 further comprises a link adaptation margin unit 318, which is adapted to derive a link adaptation margin estimate from the one or more derived error distributions, based on a predetermined radio link quality target. The radio link quality target may typically be based on a BIER target, but could also be expressed independently of a BIER. The link adaptation margin unit 318 is also adapted to support link adaptation for the radio link, e.g. by providing the link adaptation margin estimate for use as margin when selecting MCS in link adaptation. The selection of MCS could e.g. be performed in an MCS unit within the network entity 301, or be performed in another network entity.

The network entity 301 further comprises a transmitting unit 308, which is adapted to transmit signals to other network entities. The signals could e.g. comprise the link adaptation margin estimate, and/or the signals could comprise an indication of an MCS to be used by another network entity when transmitting over the radio link. The receiving unit 302 and the transmitting unit 308 could also be referred to the arrangement 300, i.e. be regarded as a part of the arrangement 300. However, in this example, the receiving and transmitting units 302 and 308 are regarded as regular component of the network entity 301

Figure 3:
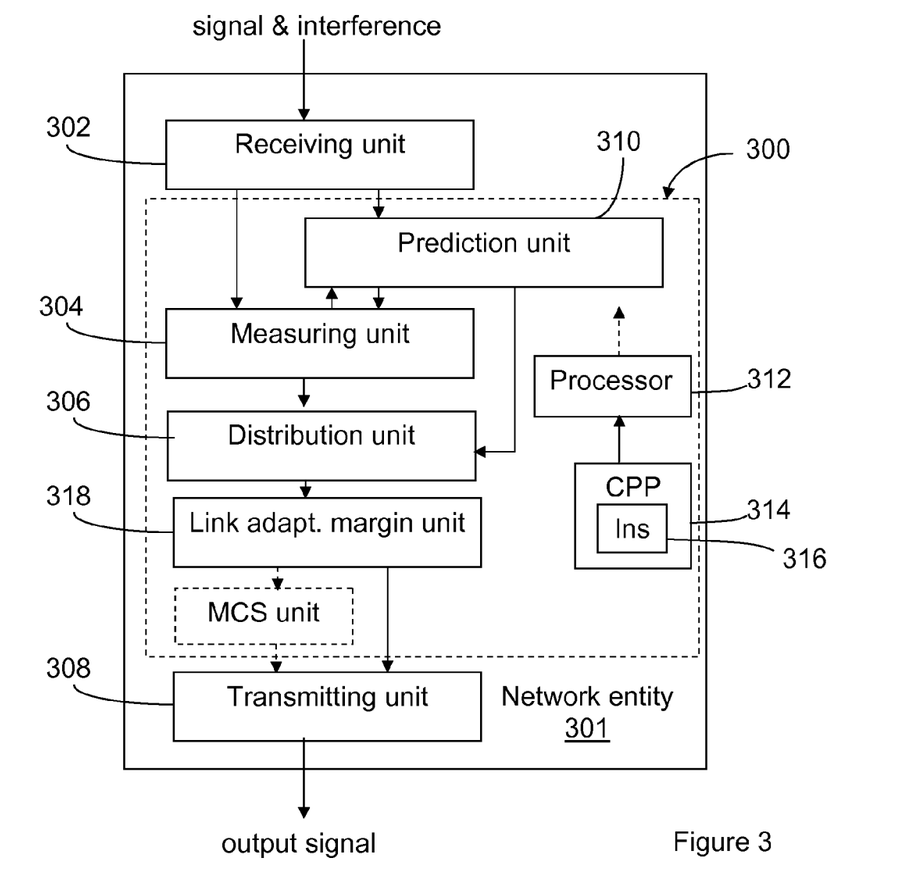
FIG. 3 is a block diagram illustrating an embodiment of an arrangement in a network entity.

In FIG. 3 is also illustrated a computer program product 314 which comprises instructions 316, which when executed by a processor 312, or similar, will cause the unit 304-306, 310 and 318, respectively, to perform their tasks according to an embodiment of the described procedure. Connections between the processor 312 and the units 304-306, 310 and 318 are illustrated by a dashed arrow.

It should be noted that FIG. 3 merely illustrates various functional unit in the network entity 301 in a logical sense. However, the skilled person is free to implement these functions in practice using any suitable software and/or hardware means, such as e.g. ASICs (Application-Specific Integrated Circuit), FPGAs (Held Programmable Gate Array) and DSFS (Digital Signal Processor). Thus, the invention is generally not limited to the shown structure of the network entity 301.

Below, an embodiment of deriving a link adaptation margin estimate from two parameter estimation error distributions for a radio link, based on a BIER target, will be described with reference to FIG. 4. FIG. 4 shows the CDR of a signal strength/gain- and an interference estimation error, respectively. In this example, the signal strength/gain and the interference are estimated and measured separately. The distributions of the signal strength/gain estimation error and the interference estimation error are assumed to be uncorrelated. The desired radio link quality, $BIER_{target}$, is 10% HARQ BIER. Thus, the target CDF-level, $Perc_{target}$, could be derived as $Perc_{target} = (1-BIER_{target})_{gain} \cdot (1-BIER_{target})_{interference} = 0,9^2 = 0,81$. In the diagrams in FIG. 4, the target CDF-level 0,81 is indicated by a bold dashed line. The signal strength/gain estimation error corresponding to the target CDF-level 0,81 is approximately 1 dB, and the interference estimation error corresponding to the target CDF-level 0,81 is approximately 4 dB. These values are indicated by vertical arrows in the diagrams. Since the signal strength/gain estimation error and the interference estimation error are assumed to be uncorrelated in this example, a link adaptation margin estimate can be formed by adding the two estimation errors corresponding to the target CDF-level $Perc_{target}$, resulting in a link adaptation margin estimate of approximately (1+4) dB=5 dB. This link adaptation margin estimate can then be used when selecting a transport format, such as an MCS, for a radio link.

An additional adjustment factor k may be needed in order to reach a desired quality target, due to other error factors, such as bias in the error estimation method in general, correlation between S and I errors, receiver dependent errors, MIMO and others, as described above, if not specifically taken into account. For example, $Perc_{target}$, which was set to $(1-BIER_{target})^2$ in the previous example, can be set to $Perc_{target} = (1-BIER_{target})^2 - k$, where k is an empirical adjustment factor that can be acquired, e.g. through simulation and/or by using statistics from an outer loop. $Perc_{target}$ could also be expressed independently of a BIER target, e.g. as $Perc_{target} = k$, where k may be a function of a BIER target or other quality target, such as bit error rate, residual packet error rate after HARQ retransmission, delay or maximum number of HARQ retransmissions. The acquirement of an adjustment factor k through simulation is further described below with reference to FIGS. 5-7.

Figure 5:
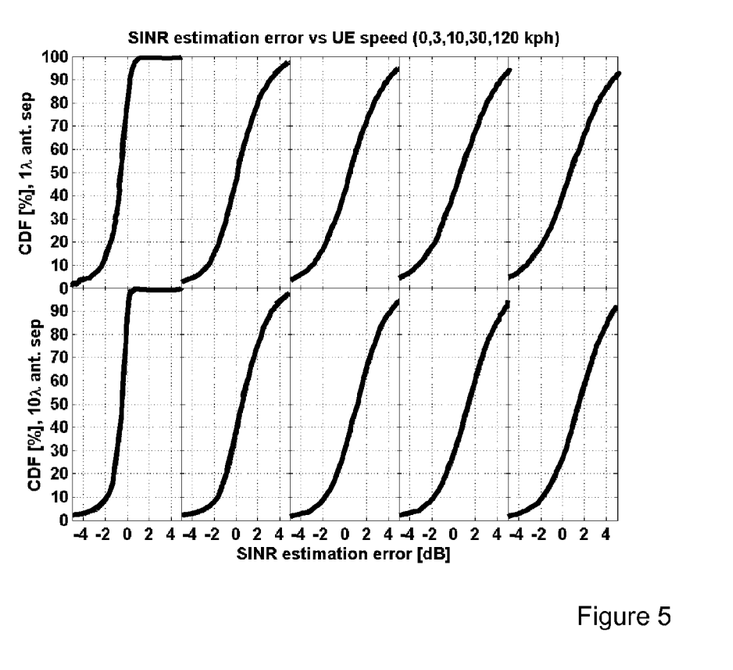
FIG. 5 shows the probability distributions of the SINR estimation error at different mobile terminal speeds and antenna separations, according to one embodiment.
Figure 6:
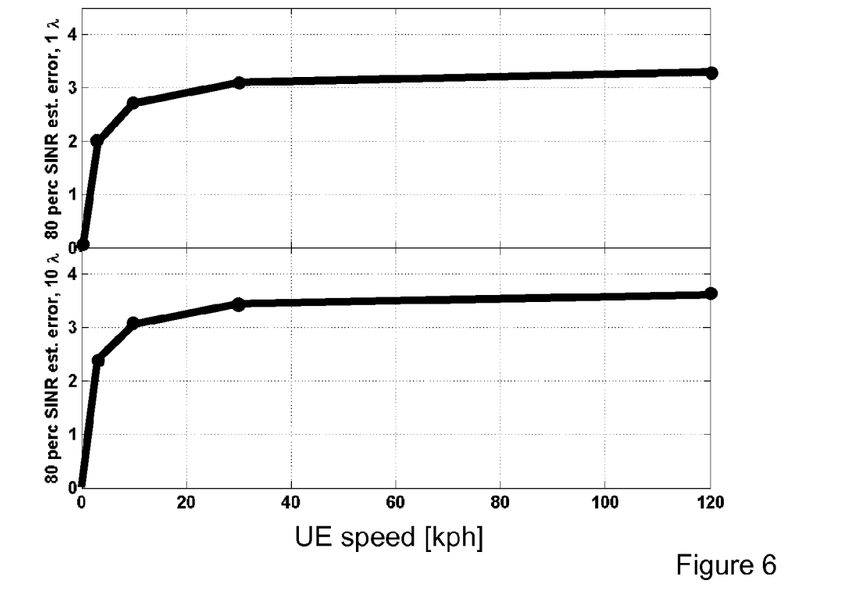
FIG. 6 shows an estimate of a suitable link adaptation margin at different antenna separations and different mobile terminal speeds.

FIG. 5 shows the result of a set of downlink simulations applying one embodiment of the invention. Simulations have been performed for two different antenna separations, 1λ and 10λ, where λ is the carrier wavelength, and for a range of mobile terminal speeds, 0, 3, 10, 30 and 120 kph. In the simulations, the estimation error distribution of the SINR is used to derive a link adaptation margin estimate, i.e. not the separate signal strength/gain- and interference estimation error distributions, as in previous examples. The diagrams in FIG. 5 show the CDF of the SINR estimation error in percent (%) to the SINR estimation error in decibel (dB). The variance of the SINR estimation error increases with increasing mobile terminal speed in the simulations FIG. 6 shows the SINR estimation error in dB at CDF 80% for the different antenna separations and mobile terminal speeds, which could also be retrieved from the diagrams in FIG. 5. The level 80% in the CDF corresponds to $Perc_{target}=80\%$, i.e. that the actual SINR should be equal to or better than the estimated SINR in at least 80% of the transmissions, and the percentile 80% is selected as a rough estimate of a suitable $Perc_{target}$, corresponding to a predetermined radio link quality target, in this simulation approximately 10% BlER. Thus, FIG. 6 shows a rough estimate of which link adaptation margin that could be suitable to use at the different antenna separations and mobile terminal speeds, respectively.

Figure 7:
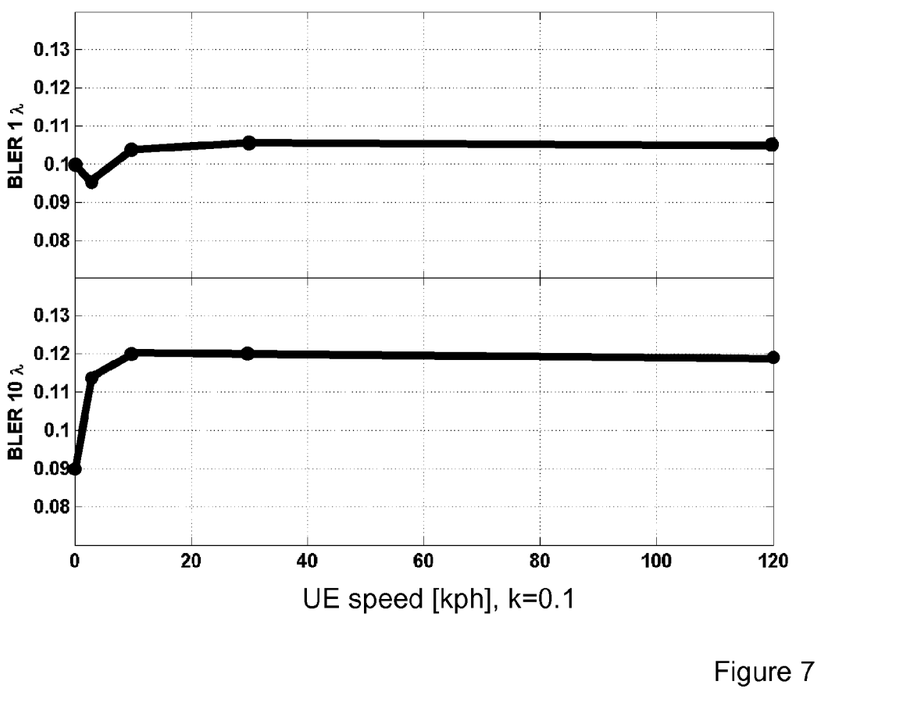
FIG. 7 shows the BIER at different mobile terminal speeds for two different antenna separations when the link adaptation margin of FIG. 6 has been applied, according to one embodiment.

FIG. 7 shows the measured BlER after simulated transmission over a radio link where the estimated values shown in FIG. 6 have been used as link adaptation margin. With a $BIER_{target}$ of 10%, empirical variations of the factor k in the simulations gave that k=0,1 was a good selection of k in this scenario. The selection of k=0,1 showed to work for the two simulated base station antenna configurations and for a range of mobile terminal speeds, which can be seen in FIG. 7.

The results of the simulation discussed above confirm the correspondence between a percentile of the error distribution and a HARQ BlER.

As previously mentioned, the embodiments of the invention could be applied in both the uplink and the downlink. Currently, there are no LTE, standard related issues preventing the implementation of different embodiments in the uplink. Regarding the LTE downlink, the existing parameters RSSI (Received Signal Strength Indicator) including interference, and RSRP (Reference Signal Received Power) excluding interference, could presumably be utilized in the estimation of an LA margin. However, the reporting mechanisms for these parameters are currently not adapted to serve embodiments of the invention. In order to achieve an efficient downlink solution, new channel quality reporting and some minor changes of the LTE, standard would be recommended. For example, one possible standard change could be to split the CQI-reporting in two, by analogy with the RSSI and RSRP, thereby enabling separate interference estimation. However, the described method can be applied in a mobile terminal for downlink within the standard, when excluding the impact of delay on error, i.e. when setting d=0 in equation (2). When d is set to d=0, $\hat{Q}$ in equation (2) represents the result of the estimation algorithm for CQI reporting of a mobile terminal, and Q is the quality at reception of downlink data.

Other possible additional features of the embodiments could e.g. be filtering of the measurements, weighting new measurements higher than old, for example by applying some forgetting factor. Such filtering would handle statistical changes in interference and fading patterns, such as increased variance due to increased terminal speed, or changed interference due to load changes in neighboring cells. Further, the interference could be measured after antenna combining, capturing receiver interference rejection capability. The signal strength could be measured per antenna and the error distribution per antenna could then be combined according to receiver method. Further, mobile terminals arriving to a cell, having no relevant measures of received signal strength/gain or interference, to which an error distribution could be formed, could initially use a cell-common error distribution instead.

Exemplary advantages of embodiment of the invention are e.g. the enabling of a faster convergence of the estimation and adjustment of an LA margin, as compared to conventionally used regular outer-loop algorithms. Further, the interference can be measured jointly for all user terminals in the uplink, which gives a more accurate result than measurements per user terminal. In the uplink, the actual received signal strength/gain can be measured for user data transmissions, but also for e.g. sounding and scheduled CSI transmissions, which is not the case in currently used solutions. This possibility enables a faster updating of an LA margin estimate, than when using previously known solutions. The access to more accurate LA margin estimates results in higher system throughput, lower transmission delay and a more stable system operation in wireless communication system. A further advantage is that the separation of SINR measurement into separate measurements of the SINR-component signal strength/gain and interference corresponds well to how channel quality measurements are implemented in many network entities today, which enables a more efficient LA margin estimation process.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has mainly been exemplified in terms of LIE, the scope of the invention is not limited hereto, but could also be applied in other systems employing link adaptation, such as e.g. WiMAX and WCDMA. The invention is generally defined by the following independent claims.

What is claimed is:

1. A method in a network entity, for supporting link adaptation in a wireless communication system, the method comprising:
    obtaining one or more predicted parameters related to the quality of a radio link;
    measuring one or more actual parameters, corresponding to the one or more predicted parameters;
    deriving one or more error distributions based on the difference between the predicted and actual one or more parameters and based on at least one correction factor e, which correction factor is based on one or more of the following:
    interference suppression or cancellation;
    characteristics of one or more network entities;
    multi user multiple input multiple output (MIMO);
    a MIMO transmission format;
    an error in modeling the receiver performance; and
    a receiver method being used;
    deriving a link adaptation margin estimate from the one or more error distributions, based on a predetermined radio link quality target; and
    supporting link adaptation for the radio link, based on the link adaptation margin estimate.

2. The method of claim 1, wherein the predetermined radio link quality target is related to a block error rate (BLER) target.

3. The method of claim 1, wherein the predicted and actual one or more parameters comprise predicted and actual parameters for received signal strength and interference, or signal-to-interference-and-noise ratio (SINR).

4. The method of claim 1, wherein different error distributions are derived for each receiver method being used and/or for each MIMO transmission format being used.

5. The method of claim 1, further comprising combining values from at least two error distributions when deriving the link adaptation margin estimate.

6. The method of claim 5, further comprising combining at least two error distributions to one error distribution before deriving an estimated link adaptation margin.

7. The method of claim 1, wherein the network entity is a network node or a mobile terminal.

8. The method of claim 1, wherein at least one of the measurements of the one or more actual parameters is frequency selective and the link adaptation is performed in a fraction of the frequency band.

9. The method of claim 1, wherein the action of supporting link adaptation involves providing the link adaptation margin estimate for use as a link adaptation margin when selecting a modulation and coding scheme (MCS) to be used for transmissions over the radio link.

10. An arrangement in a network entity, said arrangement configured to support link adaptation in a wireless communication system and comprising:
   a prediction unit configured to obtain one or more predicted parameters related to the quality of a radio link;
   a measuring unit configured to measure one or more actual parameters, corresponding to the one or more predicted parameters;
   a distribution unit configured to derive one or more error distributions based on the difference between the predicted and actual one or more parameters and based on at least one correction factor e, which correction factor is based on one or more of the following:
   interference suppression or cancellation;
   characteristics of one or more network entities;
   multi user multiple input multiple output (MIMO) effects;
   a MIMO transmission format;
   an error in modeling the receiver performance; and
   a receiver method being used; and
   a link adaptation margin unit configured to derive a link adaptation margin estimate from the one or more error distributions, based on a predetermined radio link quality target, and to support link adaptation for the radio link based on the link adaptation margin estimate.

11. The arrangement of claim 10, wherein the link adaptation margin unit is configured to derive the link adaptation margin estimate from the one or more error distributions, based on a predetermined radio link quality target, which is related to a BLER target.

12. The arrangement of claim 10, wherein the one or more predicted parameters and the corresponding one or more actual parameters include received signal strength and interference or signal-to-interference-and-noise ratio (SINR) parameters, and wherein the arrangement is configured to predict and measure received signal strength and interference or SINR.

13. The arrangement of claim 10, wherein the distribution unit is configured to derive an error distribution for each receiver method being used and/or for each multiple input multiple output (MIMO) transmission format being used.

14. The arrangement of claim 10, wherein the link adaptation margin unit is configured to combine values from at least two error distributions when deriving the link adaptation margin estimate.

15. The arrangement of claim 14, wherein the link adaptation margin unit is configured to combine at least two error distributions to one error distribution before deriving an estimated link adaptation margin.

16. The arrangement of claim 10, wherein the network entity is a network node or a mobile terminal.

17. The arrangement of claim 10, wherein one or more of the actual parameters measured by the arrangement is frequency selective, and wherein the arrangement is configured to perform the corresponding one or more measurements in a frequency selective manner.

18. The arrangement of claim 10, wherein the arrangement is configured to provide the link adaptation margin estimate, either within the network entity or to another network entity, for use as link adaptation margin when selecting an modulation and coding scheme (MCS) to be used for transmissions over the radio link.

* * * * *

UNITED STATES PATENT AND TRADEMARK OFFICE
CERTIFICATE OF CORRECTION

| | |
|---|---|
| PATENT NO. | : 8,953,480 B2 |
| APPLICATION NO. | : 13/576191 |
| DATED | : February 10, 2015 |
| INVENTOR(S) | : Alm et al. |

It is certified that error appears in the above-identified patent and that said Letters Patent is hereby corrected as shown below:

On the Title Page, item (73), Assignee, please change "Telefonaktiebolgaet" to --Telefonaktiebolaget--.

Signed and Sealed this
Ninth Day of June, 2015

Michelle K. Lee
*Director of the United States Patent and Trademark Office*